(12) United States Patent
Momchilov et al.

(10) Patent No.: US 10,958,705 B2
(45) Date of Patent: Mar. 23, 2021

(54) CLIENT COMPUTING DEVICE PROVIDING END-TO-END QUALITY OF SERVICE (QOS) CONTROL FOR SOFTWARE AS A SERVICE (SAAS) SESSIONS AND RELATED METHODS

(71) Applicant: CITRIX SYSTEMS, INC., Fort Lauderdale, FL (US)

(72) Inventors: Georgy Momchilov, Parkland, FL (US); Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 106 days.

(21) Appl. No.: 16/287,353

(22) Filed: Feb. 27, 2019

(65) Prior Publication Data
US 2020/0274912 A1    Aug. 27, 2020

(51) Int. Cl.
G06F 15/16    (2006.01)
H04L 29/06    (2006.01)
H04L 29/08    (2006.01)

(52) U.S. Cl.
CPC .......... *H04L 65/80* (2013.01); *H04L 65/1069* (2013.01); *H04L 67/16* (2013.01); *H04L 67/42* (2013.01)

(58) Field of Classification Search
CPC ..... H04L 65/80; H04L 65/1069; H04L 67/16; H04L 67/42
See application file for complete search history.

(56) References Cited

U.S. PATENT DOCUMENTS

| | | |
|---|---|---|
| 9,176,744 B2 | 11/2015 | Lee |
| 9,538,345 B2 | 1/2017 | Sah et al. |
| 9,693,366 B2 | 6/2017 | Adjakple et al. |
| 10,027,739 B1 * | 7/2018 | Krishnan ................ G06F 11/00 |
| 10,102,593 B2 * | 10/2018 | Benfield ................ G06F 16/41 |
| 10,178,043 B1 * | 1/2019 | Ganjam ................ H04L 65/80 |
| 10,349,059 B1 * | 7/2019 | Good .................... H04N 19/164 |
| 2007/0030833 A1 | 2/2007 | Pirzada et al. |

(Continued)

FOREIGN PATENT DOCUMENTS

WO    WO2004091152    10/2004

OTHER PUBLICATIONS

R. N. Calheiros, R. Ranjan and R. Buyya, "Virtual Machine Provisioning Based on Analytical Performance and QoS in Cloud Computing Environments," 2011 International Conference on Parallel Processing, Taipei City, 2011, pp. 295-304, doi: 10.1109/ICPP.2011.17. (Year: 2011).*

(Continued)

*Primary Examiner* — Jonathan A Bui
(74) *Attorney, Agent, or Firm* — Allen, Dyer, Doppelt + Gilchrist, PA (57) ABSTRACT

A client computing device for use with a server configured to provide Software as a Service (SaaS) application sessions is provided. The client computing device may include a memory and a processor cooperating therewith to run a SaaS application session based upon a SaaS application data stream between the client computing device and the server, determine an end-to-end Quality of Service (QoS) for the SaaS application session, and change the SaaS application data stream based upon changes in the end-to-end QoS for the SaaS application session.

20 Claims, 7 Drawing Sheets

(56) References Cited

U.S. PATENT DOCUMENTS

| | | | |
|---|---|---|---|
| 2008/0229323 A1* | 9/2008 | Mackey | G06F 11/3414 |
| | | | 719/311 |
| 2013/0179985 A1* | 7/2013 | Strassmann | G06F 21/60 |
| | | | 726/26 |
| 2014/0304393 A1* | 10/2014 | Annamalaisami | H04L 67/146 |
| | | | 709/224 |
| 2014/0365556 A1* | 12/2014 | Rehan | H04L 65/60 |
| | | | 709/203 |
| 2015/0195328 A1* | 7/2015 | Rehan | H04L 65/602 |
| | | | 709/219 |
| 2015/0319063 A1 | 11/2015 | Zourzouvillys | |
| 2015/0341812 A1 | 11/2015 | Dion et al. | |
| 2016/0306895 A1* | 10/2016 | Kaewell | H04L 67/02 |
| 2017/0050111 A1* | 2/2017 | Perry | H04L 67/10 |
| 2017/0312626 A1* | 11/2017 | Colenbrander | A63F 13/48 |
| 2017/0330496 A1* | 11/2017 | Oravainen | A63F 13/5255 |
| 2018/0068132 A1* | 3/2018 | Zubair | H04L 63/0807 |
| 2018/0174401 A1* | 6/2018 | Iao | G07F 17/3209 |
| 2018/0198838 A1 | 7/2018 | Murgia et al. | |
| 2018/0212930 A1* | 7/2018 | Cammisa | H04L 63/0272 |
| 2018/0288636 A1* | 10/2018 | Huang | H04W 24/08 |
| 2019/0034312 A1* | 1/2019 | Karunamoorthy | G06F 11/302 |
| 2019/0222491 A1* | 7/2019 | Tomkins | H04L 41/5016 |
| 2019/0280932 A1* | 9/2019 | Gazzetti | H04L 41/0896 |
| 2019/0342426 A1* | 11/2019 | Momchilov | G06F 9/544 |
| 2020/0036768 A1* | 1/2020 | Bedi | H04L 65/80 |
| 2020/0084435 A1* | 3/2020 | Harries | G06Q 30/0241 |
| 2020/0204368 A1* | 6/2020 | Cotta | A63F 13/35 |
| 2020/0218341 A1* | 7/2020 | Young | G06F 3/016 |

OTHER PUBLICATIONS

Anonymous "Quality of service—Wikipedia" https:jjen.wikipedia.org/w/index.php?title=Quality of service&oldid=883636447; Feb. 16, 2019; pp. 11.

* cited by examiner

CLIENT COMPUTING DEVICE PROVIDING END-TO-END QUALITY OF SERVICE (QOS) CONTROL FOR SOFTWARE AS A SERVICE (SAAS) SESSIONS AND RELATED METHODS

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, and/or provide access to shared applications, along with additional computing devices to provide management and customer portals for the cloud system.

SUMMARY

A client computing device for use with a server configured to provide Software as a Service (SaaS) application sessions is provided. The client computing device may include a memory and a processor cooperating therewith to run a SaaS application session based upon a SaaS application data stream between the client computing device and the server, determine an end-to-end Quality of Service (QoS) for the SaaS application session, and change the SaaS application data stream based upon changes in the end-to-end QoS for the SaaS application session.

In one example embodiment, the processor may determine the end-to-end QoS based upon a type of SaaS application data traffic being communicated within the SaaS application data stream. In another example embodiment, the processor may determine the end-to-end QoS based upon a request-to-render time. In still another example implementation, the processor may determine the end-to-end QoS based upon usage of an input device.

In an example embodiment, the client computing device may have a display and a digital camera coupled to the processor, and the processor may determine the end-to-end QoS based upon a user viewing time of the display measured using the digital camera. Furthermore, the processor may selectively change the SaaS application data stream by changing a communications link assigned to the SaaS application data stream. In one example implementation, the processor may change the SaaS application data stream to a low latency communications link for interactive SaaS application data traffic. In accordance with another example, the processor may change the SaaS application data stream to a high bandwidth communications link for bulk data transfer or multimedia SaaS application data traffic.

In addition, the client computing device may selectively change the SaaS application data stream by changing a display attribute associated with the SaaS application session. By way of example, the client computing device may run the SaaS application session within an embedded browser. In accordance with another example, the SaaS application session may comprise a native SaaS application session, and the client computing device may run the SaaS application session within a virtual private network (VPN) session.

A related method may include, at a client computing device, cooperating with a server to run a SaaS application session based upon a SaaS application data stream between the client computing device and the server, determining an end-to-end QoS for the SaaS application session, and changing the SaaS application data stream based upon changes in the end-to-end QoS for the SaaS application session.

A related non-transitory computer-readable medium is also provided for a client computing device. The computer-readable medium may have computer-executable instructions for causing the client computing device to perform steps including running a SaaS application session based upon a SaaS application data stream between the client computing device and a server, determining an end-to-end QoS for the SaaS application session, and changing the SaaS application data stream based upon changes in the end-to-end QoS for the SaaS application session.

DETAILED DESCRIPTION

Generally speaking, the system and methods described herein relate to an approach for providing remotes access to shared application sessions by client computing devices, such as Software as a Service (SaaS) applications provided through a virtual desktop interface (VDI) infrastructure. More particularly, the computing system and methods set forth herein allow for a complete, end-to-end Quality of Service (QoS) to be determined for SaaS applications sessions, as well as the ability to enhance SaaS application session performance through changes to a SaaS application data stream based upon the end-to-end QoS determination. As such, an improved virtual computing environment with enhanced functionality and access to virtualized computing resources such as SaaS application sessions.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
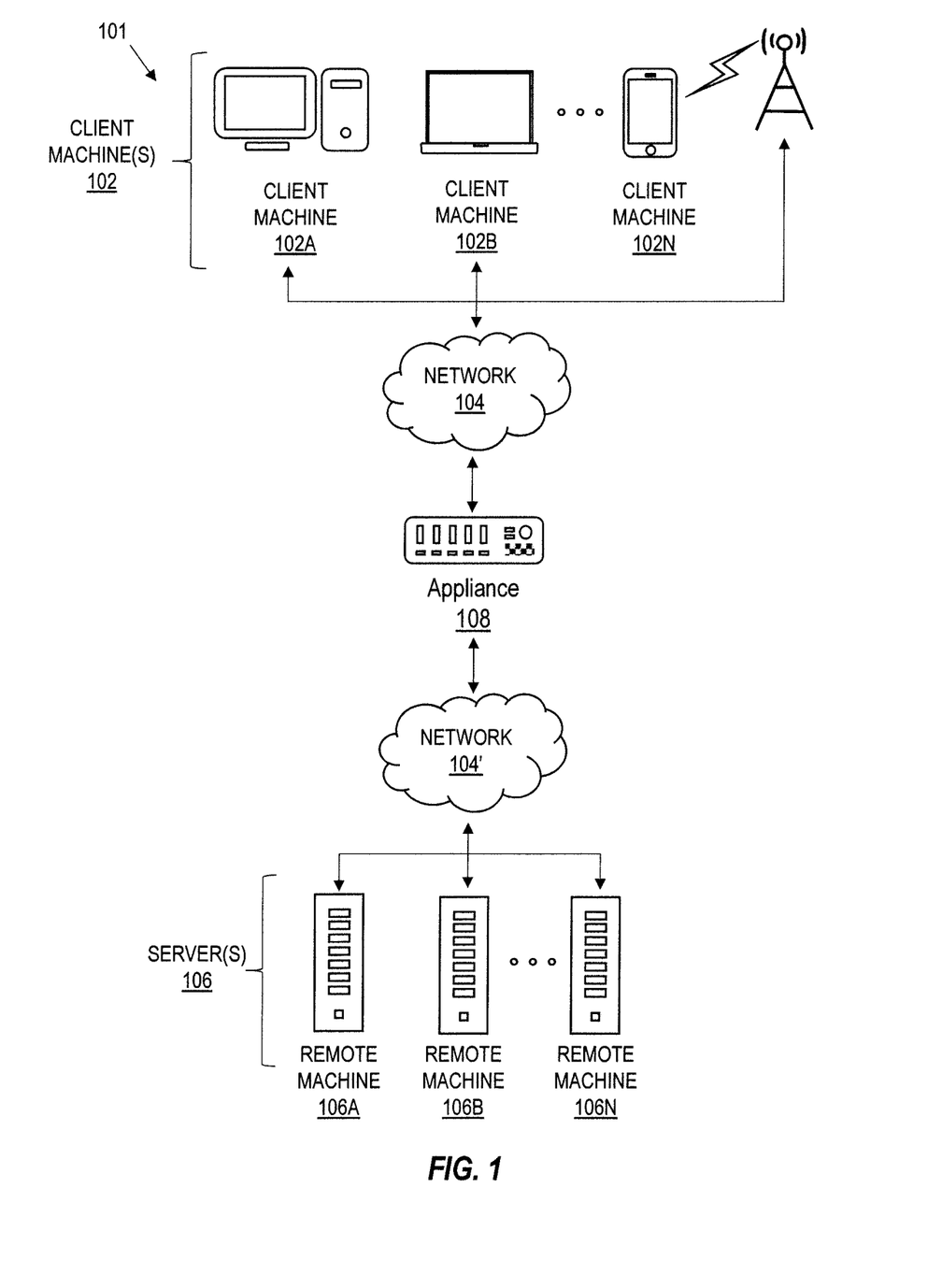
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
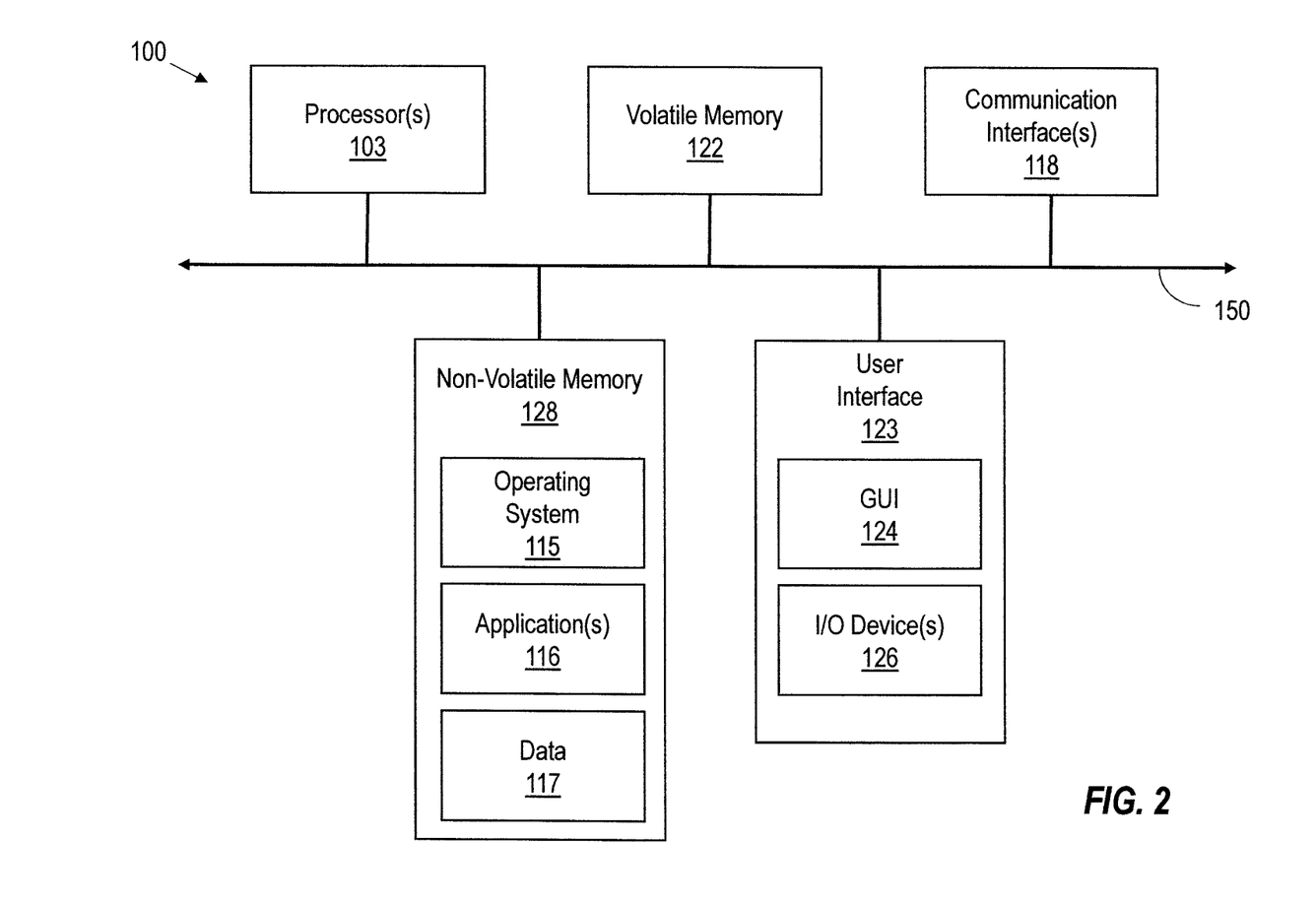
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are ekecuted by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
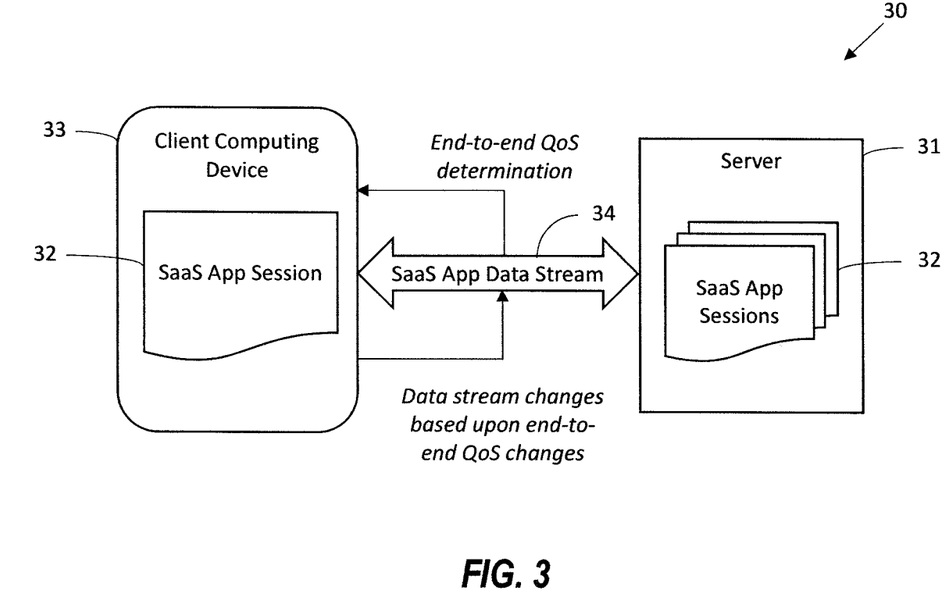
FIG. 3 is a schematic block diagram of a computing system providing end-to-end SaaS application session QoS monitoring and adjustment features in accordance with an example embodiment.

Turning to FIG. 3, a computing system 30 which provides end-to-end Quality of Service (QoS) determination and adjustment for Software as a Service (SaaS) application sessions is now described. By way of background, SaaS vendors typically do not know what the actual QoS being delivered to different users is for their web applications. More particularly, upon each request from a user agent, the SaaS vendor serves dynamic web pages to the end user. However, since SaaS vendors do not control the client (browser), they do not have the ability to determine the end-to-end user experience, nor do they have visibility into the behavior of the end user for these web applications.

The computing system 30 illustratively includes a server 31 configured to provide access to SaaS application sessions 32 for one or more client computing devices 33. In some example implementations, the server 31 may be a SaaS server which interfaces directly with the client computing device 33. In accordance with another example, the computing system 30 may be implemented as a unified endpoint management (UEM) system in which the server 31 allows for centralized control of the client computing device 33 and provides an interface to a third-party SaaS provider (or provides SaaS application sessions itself). It should be noted that other configurations of the computing system 30 are also possible, such as an enterprise mobility management (EMM) configuration, for example. In accordance with one example embodiment, the server 31 may be implemented as part of a Citrix Workspace implementation in combination with Citrix Netscaler Secure Web Gateway to provide SaaS application access as discussed further below, but it will be appreciated that other systems and platforms may be used in different embodiments.

In such implementations, the server 31 allows for the enforcement of data loss prevention (DLP) and/or other security policies for user access to various applications and data, and in some instances may be implemented in conjunction with a mobile device management (MDM) agent installed on the client computing device 33. Also, the computing system 30 may utilize a mobile application management (MAM) approach, which provides enterprise control at the application level for managing and securing application data without installing an agent on the client computing device 33. By way of example, the client computing device 33 may be a desktop computer, laptop computer, tablet computer, smartphone, etc.

The server 31 is configured to provide SaaS application sessions 32 as noted above, and the client computing device 33 cooperates with the server to run one of the SaaS application sessions based upon a SaaS application data stream 34 between the client computing device and the server. Moreover, the client computing device 33 also cooperates with the server 31 to determine an end-to-end QoS for the SaaS application session 32 in use by the client computing device, and change the SaaS application data stream 34 as required based upon changes in the end-to-end QoS for the SaaS application session.

Various approaches may be used for determining the end-to-end QoS, and changing the SaaS application data stream 34 as appropriate. In some implementations, the QoS determination may be based on policies for the user, app, content, etc. Referring additionally to the example illustrated in FIG. 4, the client computing device 33 may utilize different communications links for the SaaS application data stream 34 to communicate with the server 31. In some instances, a degradation in QoS may be a result of the particular communications link being used. For example, the type of data being communicated by the SaaS application session 32 may not be well matched with the particular communications link in use by the client computing device 33. In this regard, the client computing device 33 may determine a type of SaaS application data traffic being communicated within the SaaS application data stream 34, and accordingly that the QoS is below an acceptable threshold, if this type of SaaS application data traffic is not matched to the appropriate communications link. In the illustrated example, a low latency link 35, which has low latency but not necessarily high bandwidth, is associated with interactive SaaS data traffic (e.g., for data form entry, when typing text, etc.). On the other hand, a high bandwidth link 36 (e.g., a very small aperture terminal (VSAT) link, etc.) may be associated with multimedia traffic (e.g., video apps/streaming), file downloads, etc. The client computing device 33 may therefore selectively change the SaaS application data stream 34 by switching between the different communications links 35, 36 (or other links) assigned to the SaaS application data stream as appropriate as changes in the type of SaaS application data being transmitted occur.

Figure 4:
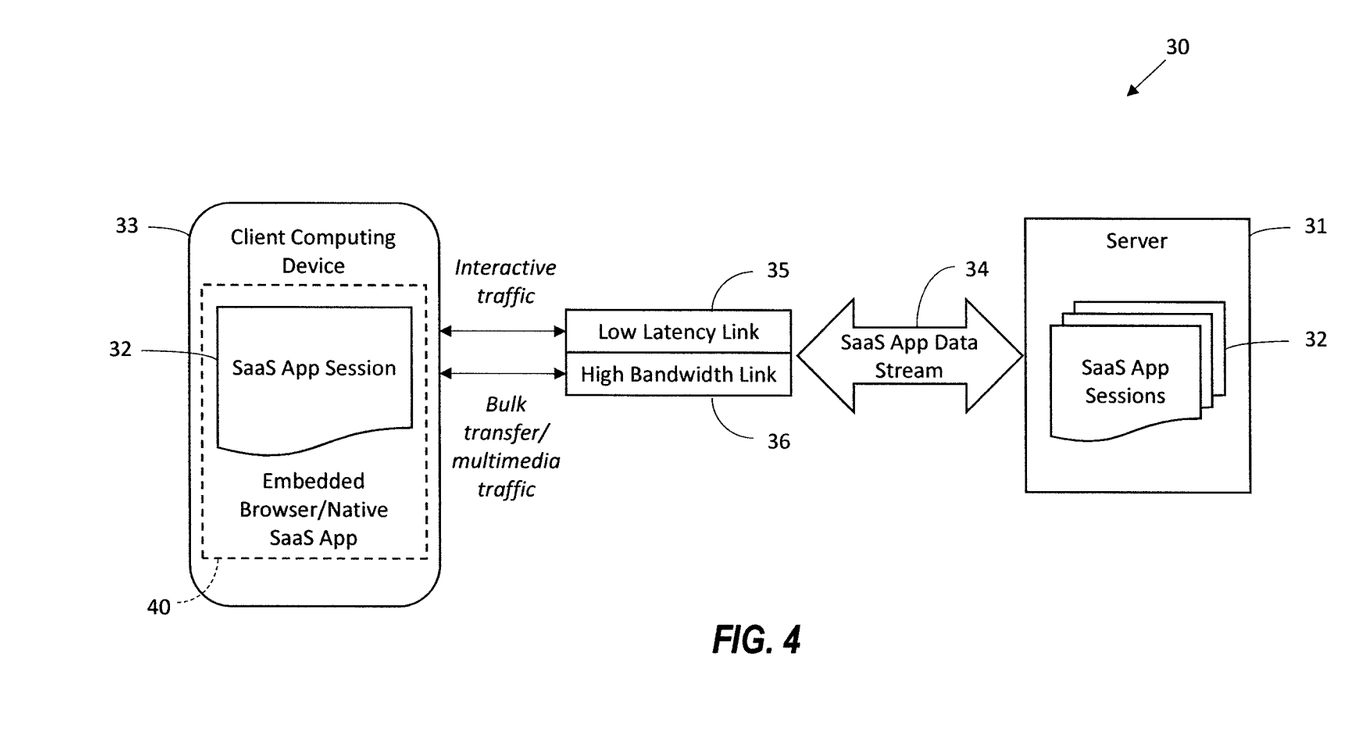
FIG. 4 is a schematic block diagram of the computing system of FIG. 3 illustrating an example approach for providing QoS adjustments by changing communication links associated with a SaaS application data stream.

In the context of an UEM/EMM configuration, QoS may be monitored directly from within an embedded browser (or native SaaS app) 40. For example, this may be done by applying different throttling, or through software-defined networking in a wide area network (SD-WAN). Furthermore, the embedded browser 40 may also open multiple independent transport connections to a secure gateway/SD-WAN, so that they may be independently prioritized, if desired. Native SaaS apps may be run at the client computing device 33 within a virtual private network (VPN) session, for example.

Figure 5:
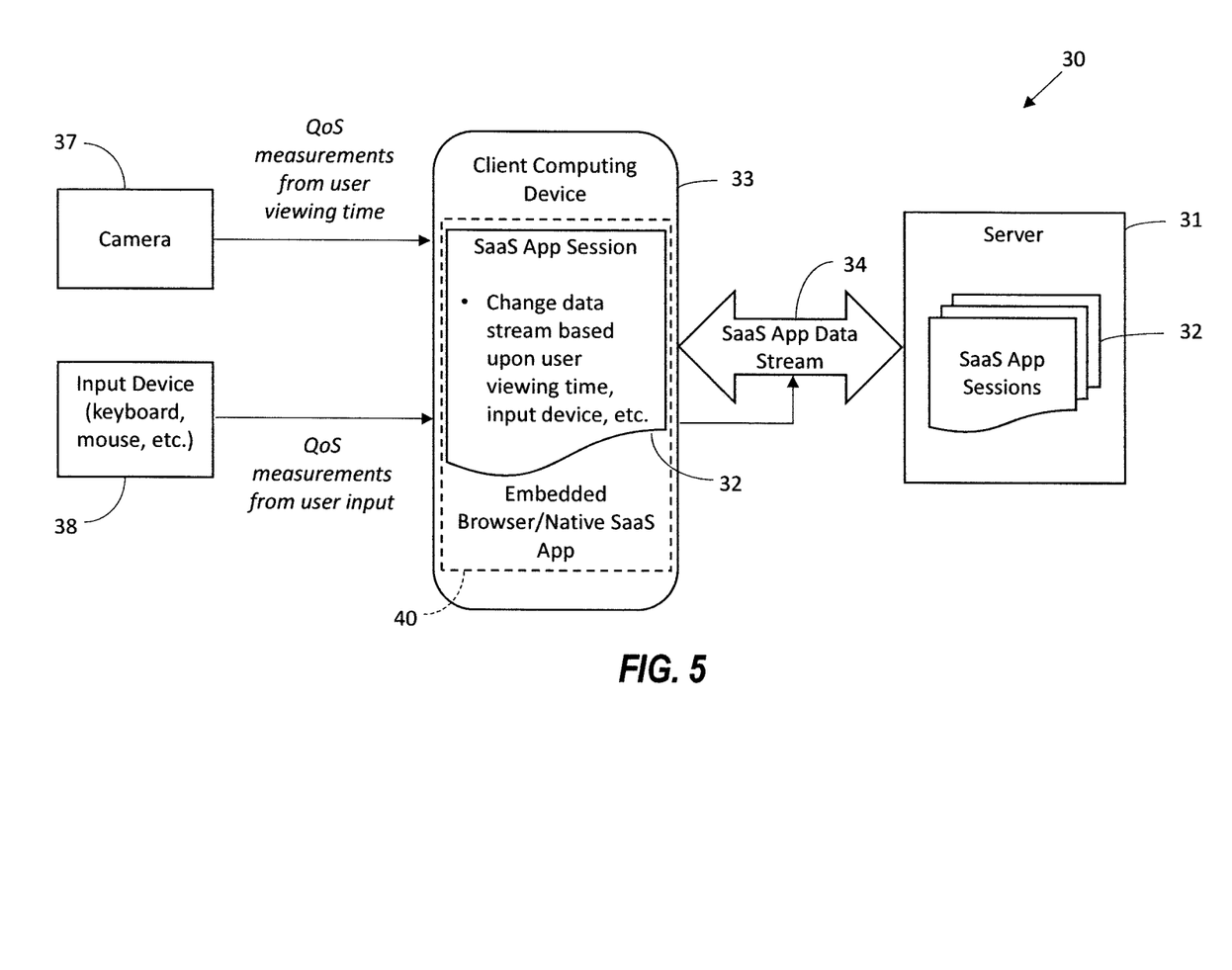
FIG. 5 is a schematic block diagram of the computing system of FIG. 3 illustrating an example approach for measuring end-to-end SaaS application QoS based upon various user input devices.

Referring now to FIG. 5, in another example implementation, the client computing device 33 has one or more input devices 38 (e.g., keyboard, mouse/trackpad, etc.) associated therewith, which may either be integrated in a single form factor (as with a smartphone) or connected to the client computing device via a wired or wireless connection (as with a desktop computer). Moreover, in this example the client computing device 33 also illustratively includes a digital camera 37, which again may be integrated in the housing of the client computing device or separate. The client computing device 33 may advantageously determine the end-to-end QoS based upon usage of the input device 38, and/or an output from the camera 37. That is, the client computing device 33 may advantageously track user actions via the input device(s) 38 and camera 37, e.g., within the embedded browser (or native SaaS app) 40. For example, the time a user takes to respond to rendered content may be determined based upon a time it takes for the user to provide a response via the input device(s) 38.

In another example, a user viewing time of a display may be measured using the camera 37 through facial recognition/eye movement tracking, etc. The actual view time of a page may be computed as the number of milliseconds a user is looking at a page after it is fully rendered. By using the camera 37 to observe the actual view time, enhanced accuracy is achieved by avoiding times when the user is looking away or steps away from or sets aside the client computing device. These times may be compared to a QoS threshold time or range of times (or other metrics in different embodiments) to determine when a change to the SaaS application data stream 34 is appropriate.

This approach may also be applied to a mobile version of a SaaS app at the network layer as opposed to Web apps only. For example, this may be done by hooking using app container technology, such as the Mobile Device Experience (MDX) toolkit from Citrix Systems. In still another example implementation, a software-defined application delivery platform such as Cedexis from Citrix Systems may also be used, which tracks user experience (UX) with web traffic from different users and locations, and may provide an optimal path accordingly.

The end-to-end QoS for SaaS applications may be determined as a function of mouse/keyboard usage (i.e., as determined from the input device(s) 38), actual view time of a page (i.e., as determined from the camera 37), and/or request-to-render-time, which is discussed further below with reference to FIG. 6. In this way, the computing system 30 advantageously allows the actual QoS to be measured up and to the user's perspective, rather than just an upstream measurement of latency or response time as measured by the server 31 or an intermediate network appliance, for example.

Figure 6:
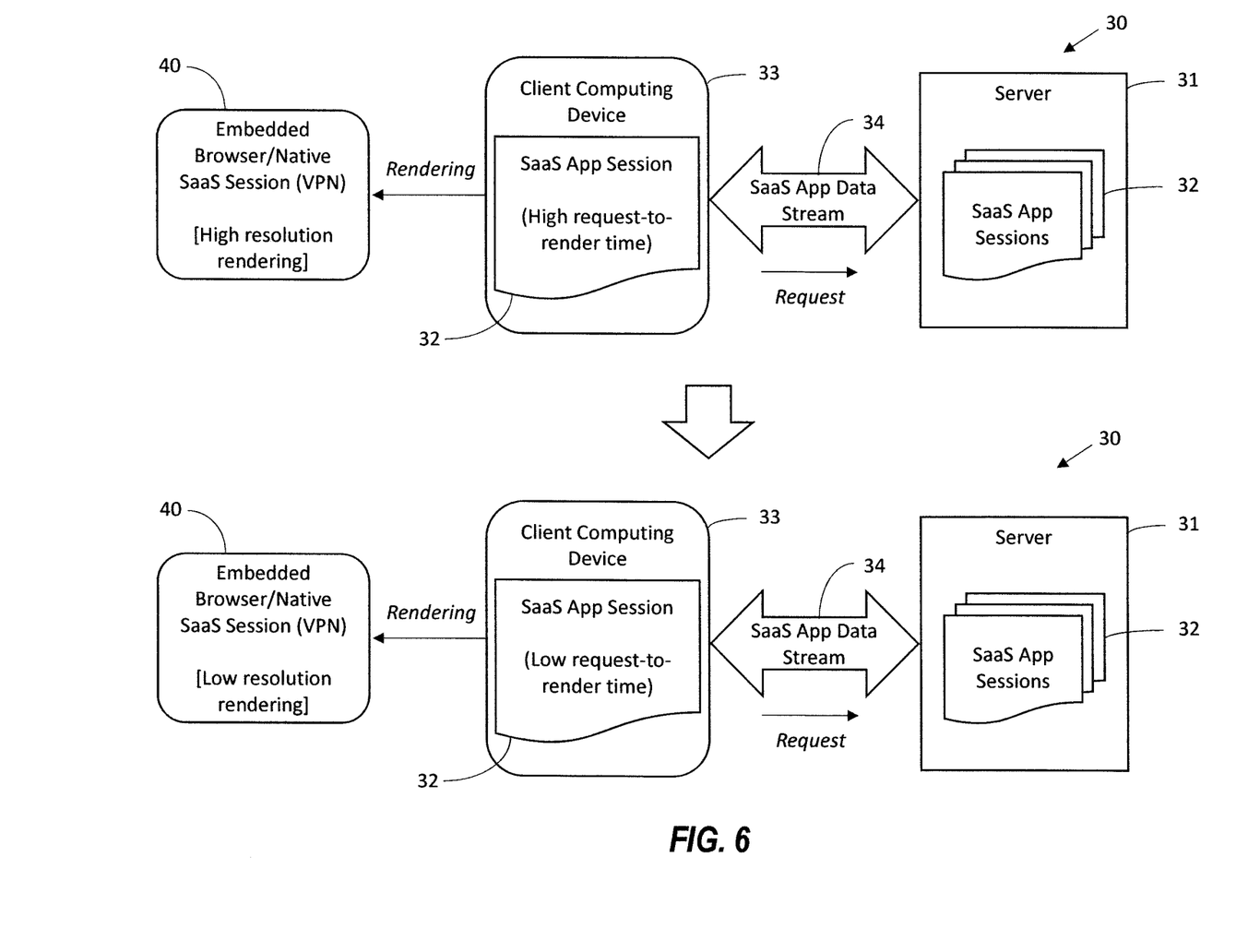
FIG. 6 is a schematic block diagram of the system of FIG. 3 illustrating an example approach for providing QoS adjustments based upon a request to render time.

Referring additionally to FIG. 6, as noted above the client computing device 33 may also determine the end-to-end QoS based upon a request-to-render time. The request-to-render time may be measured from the time a rendering request is sent from the client computing device 33 (e.g., by the embedded browser (or native SaaS app) 40) to the server 31, until the fully-rendered page is sent back from the server to the client computing device and displayed by the embedded browser on an associated display. In the present example, the client computing device 33 is rendering the SaaS application session 32 contents via the embedded browser (or native SaaS app) 40 in a relatively high resolution at an initial time. When it is determined that the end-to-end QoS is below a desired threshold based upon the measured request-to-render time, the client computing device 33 selectively changes the SaaS application data stream 34 by changing a display attribute associated with the SaaS application session. Here, the client computing device 33 cooperates with the server 31 to switch the SaaS application content delivery from the higher resolution to a lower resolution to advantageously help increase the end-to-end QoS.

Figure 7:
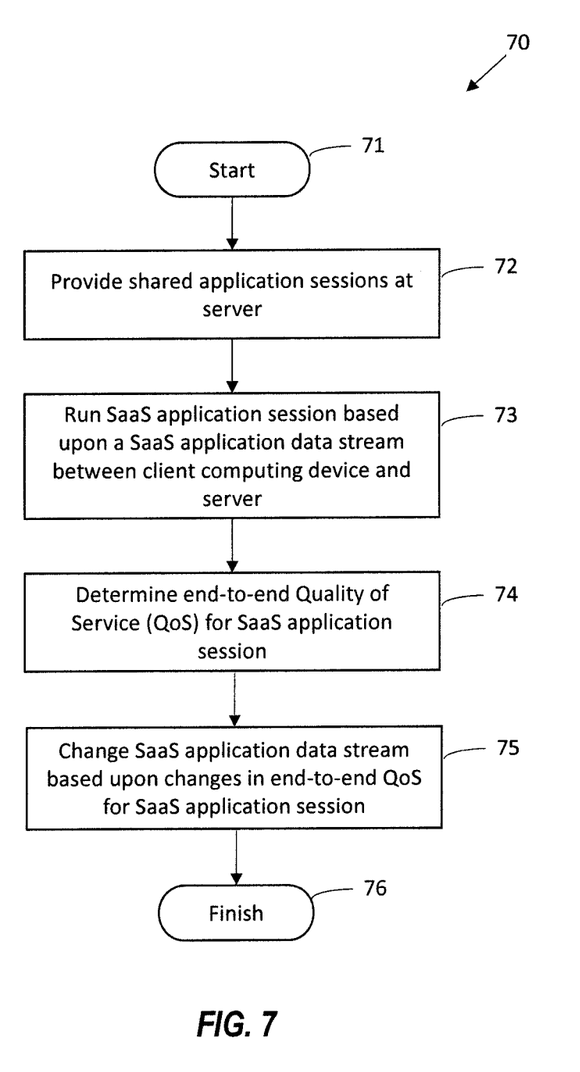
FIG. 7 is a flow diagram illustrating example method aspects associated with the system of FIG. 3.

A related method is now described with reference to the flow diagram 70 of FIG. 7. Beginning at Block 71, the method illustratively includes providing SaaS application sessions 32 at the server 31 (Block 72), and at the client computing device 33, running one of the SaaS application sessions based upon the SaaS application data stream 34 between the client computing device and the server (Block 73), as discussed further above. The method further illustratively includes determining an end-to-end QoS for the SaaS application session 32, at Block 74, and changing the SaaS application data stream 34 based upon changes in the end-to-end QoS for the SaaS application session (Block 75), as also discussed further above. The method of FIG. 7 illustratively concludes at Block 76.

The above-described approach advantageously not only allows for a complete, end-to-end QoS to be determined for a SaaS applications session, but also the ability to change the behavior of the SaaS application session via changes to the SaaS application data stream 34 to thereby improve the end-to-end QoS. Again, this may be done by changing the network connection path, downgrading images to improve transport and rendering time, changing a layout of the application, choosing a better variant of page/components, such as through A/B testing, etc. Moreover, it will be appreciated that one or more of these approaches (or others) to SaaS application data stream 34 manipulation may be used in different combinations in different embodiments.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A client computing device for use with a server configured to provide Software as a Service (SaaS) application sessions, the client computing device comprising:
 a memory and a processor cooperating therewith to
  run a SaaS application session based upon a SaaS application data stream between the client computing device and the server,
  determine an end-to-end Quality of Service (QoS) for the SaaS application session based upon a user response time to a SaaS application session page rendered on an associated display, and
  change the SaaS application data stream based upon changes in the end-to-end QoS for the SaaS application session.

2. The client computing device of claim 1 wherein the processor determines the end-to-end QoS further based upon a type of SaaS application data traffic being communicated within the SaaS application data stream.

3. The client computing device of claim 1 wherein the processor determines the end-to-end QoS further based upon a request-to-render time.

4. The client computing device of claim 1 wherein the processor further determines the end-to-end QoS based upon usage of an input device.

5. The client computing device of claim 1 further comprising a digital camera coupled to the processor; and wherein the processor further determines the end-to-end QoS based upon a user viewing time of the display measured using the digital camera.

6. The client computing device of claim 1 wherein the processor changes the SaaS application data stream by changing a communications link assigned to the SaaS application data stream.

7. The client computing device of claim 6 wherein the processor changes the SaaS application data stream to a low latency communications link for interactive SaaS application data traffic.

8. The client computing device of claim 6 wherein the processor changes the SaaS application data stream to a high bandwidth communications link for bulk data transfer or multimedia SaaS application data traffic.

9. The client computing device of claim 1 wherein the processor changes the SaaS application data stream by changing a display attribute associated with the SaaS application session.

10. The client computing device of claim 1 wherein the processor runs the SaaS application session within an embedded browser.

11. The client computing device of claim 1 wherein the SaaS application session comprises a native SaaS application session, and wherein the processor runs the native SaaS application session within a virtual private network (VPN) session.

12. A method comprising:
 at a client computing device,
  running a Software as a Service (SaaS) application session based upon a SaaS application data stream between the client computing device and a server,
  determining an end-to-end Quality of Service (QoS) for the SaaS application session based upon a user response time to a SaaS application session page rendered on an associated display, and
  changing the SaaS application data stream based upon changes in the end-to-end QoS for the SaaS application session.

13. The method of claim 12 wherein determining further comprises determining the end-to-end QoS based upon a type of SaaS application data traffic being communicated within the SaaS application data stream.

14. The method of claim 12 wherein determining further comprises determining the end-to-end QoS based upon a request-to-render time.

15. The method of claim 12 wherein the client computing device has an input device associated therewith, and wherein determining further comprises determining the end-to-end QoS based upon usage of the input device.

16. The method of claim 12 wherein the client computing device has a digital camera associated therewith, and wherein determining comprises determining the end-to-end QoS based upon a user viewing time of the display measured using the digital camera.

17. A non-transitory computer-readable medium for a client computing device having computer-executable instructions for causing the client computing device to perform steps comprising:
 running a Software as a Service (SaaS) application session based upon a SaaS application data stream between the client computing device and a server;
 determining an end-to-end Quality of Service (QoS) for the SaaS application session based upon a user response time to a SaaS application session page rendered on an associated display; and
 changing the SaaS application data stream based upon changes in the end-to-end QoS for the SaaS application session.

18. The non-transitory computer-readable medium of claim 17 wherein determining further comprises determining the end-to-end QoS based upon a type of SaaS application data traffic being communicated within the SaaS application data stream.

19. The non-transitory computer-readable medium of claim 17 wherein determining further comprises determining the end-to-end QoS based upon a request-to-render time.

20. The non-transitory computer-readable medium of claim 17 wherein the client computing device has an input device associated therewith, and wherein determining further comprises determining the end-to-end QoS based upon usage of the input device.

* * * * *